April 20, 1926.
G. G. WILEY
AUTOMATIC RECORDING TRACK SCALE
Filed March 11, 1925  15 Sheets-Sheet 2
1,581,771
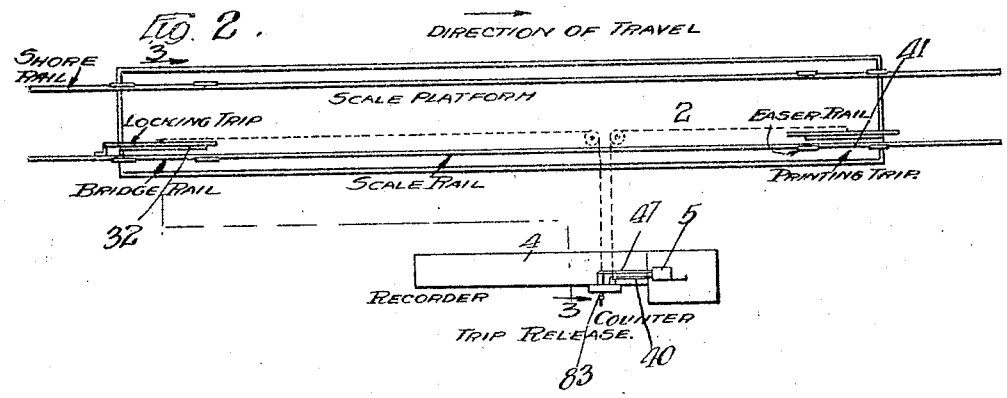
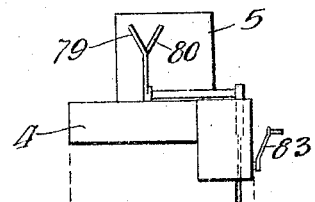
Fig. 3.
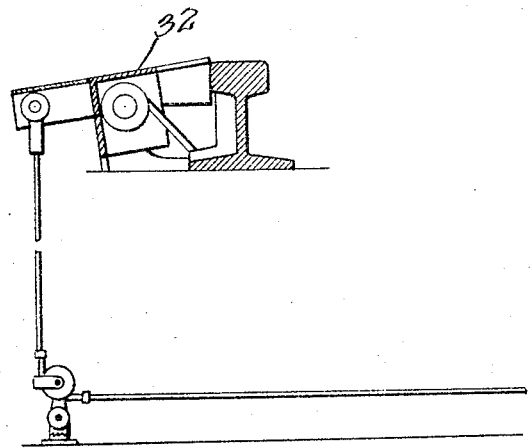
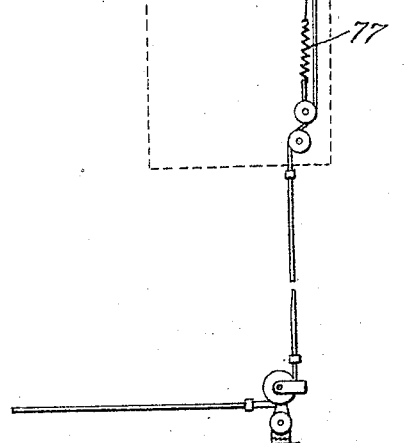
Witnesses
Harry B. White
William P. Kilroy
Inventor
George G. Wiley
By Rudolph Wm. Lotz Atty April 20, 1926.
G. G. WILEY
1,581,771
AUTOMATIC RECORDING TRACK SCALE
Filed March 11, 1925    15 Sheets-Sheet 3
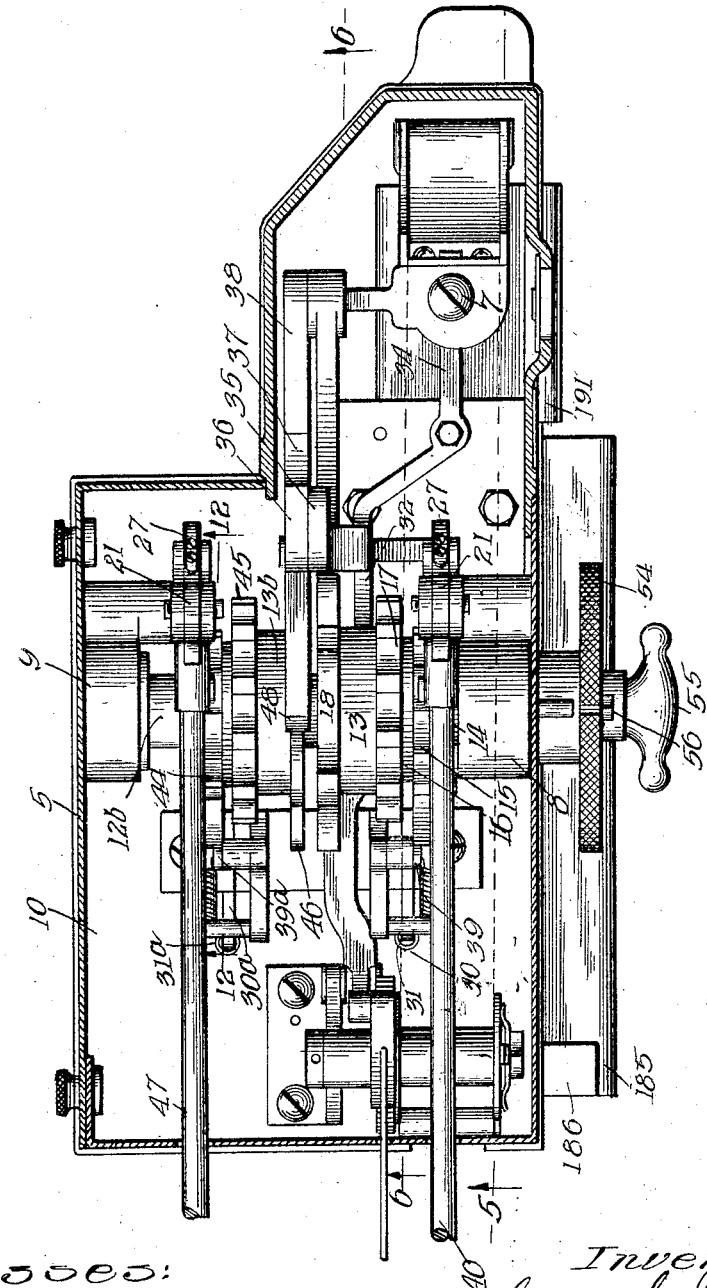

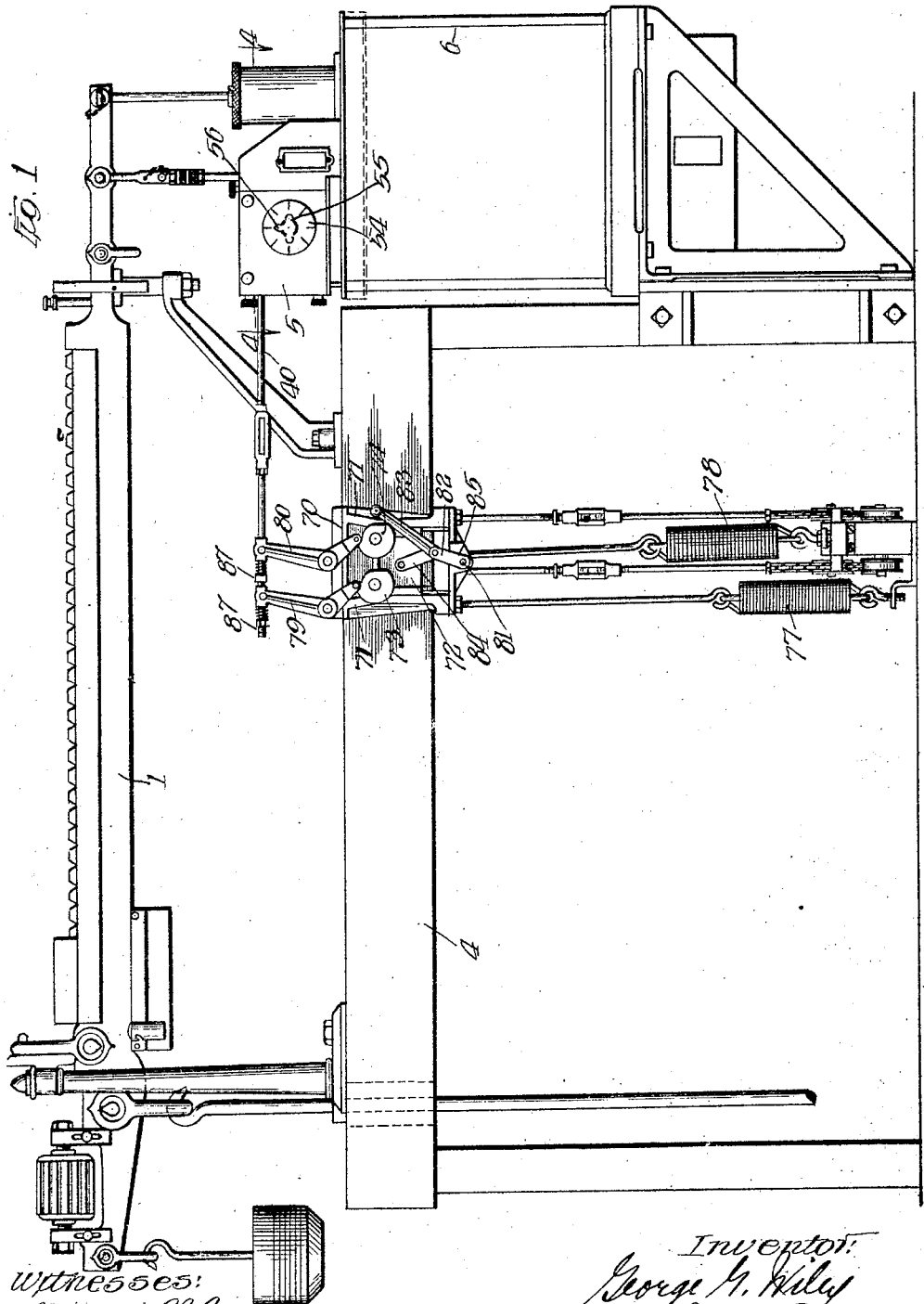

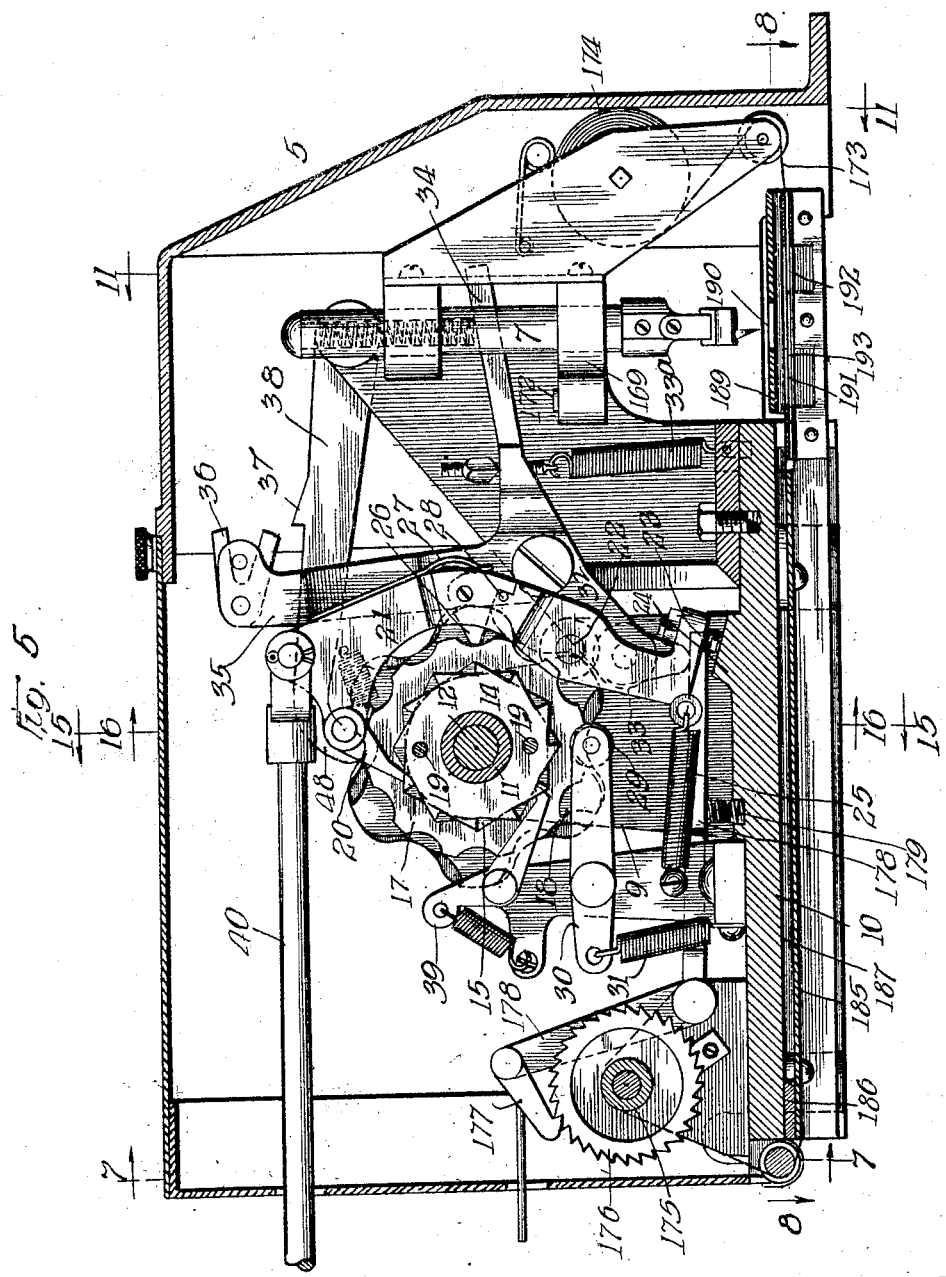

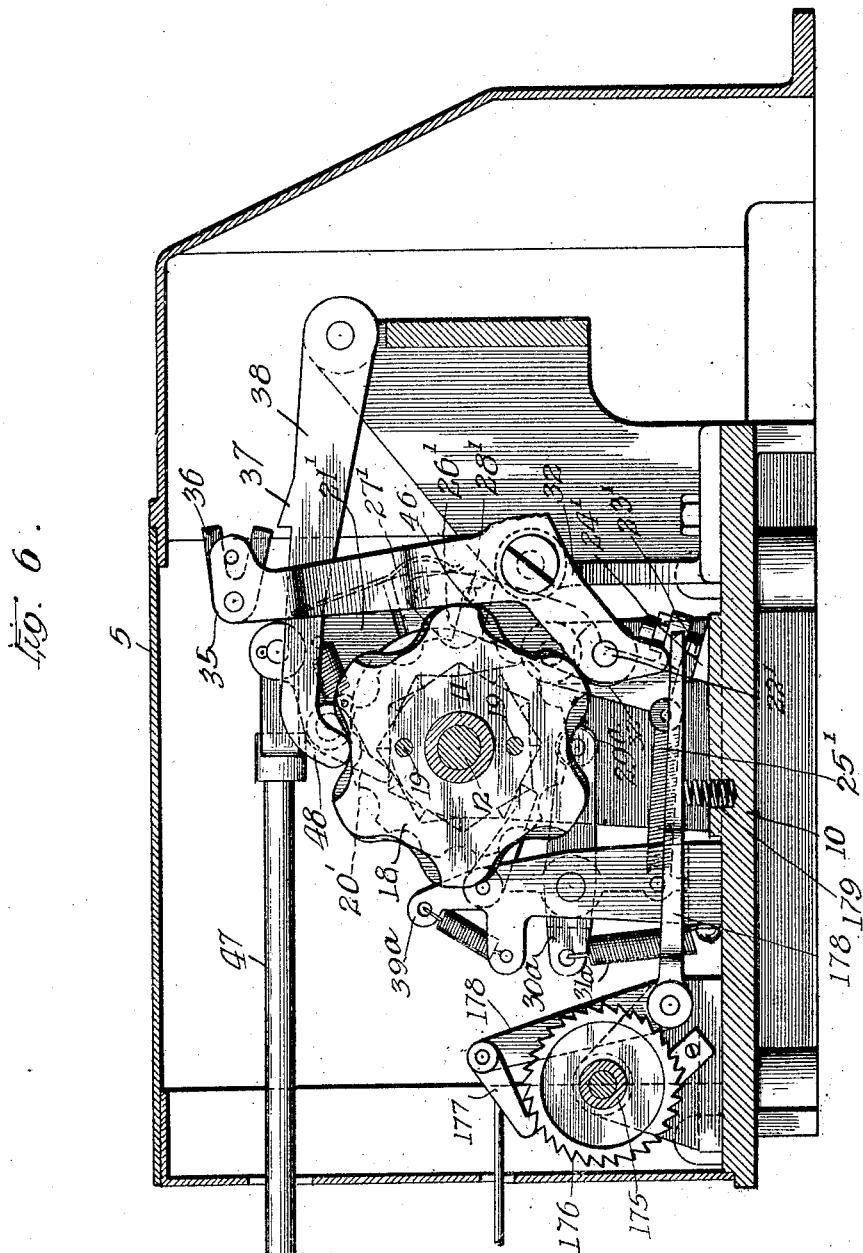

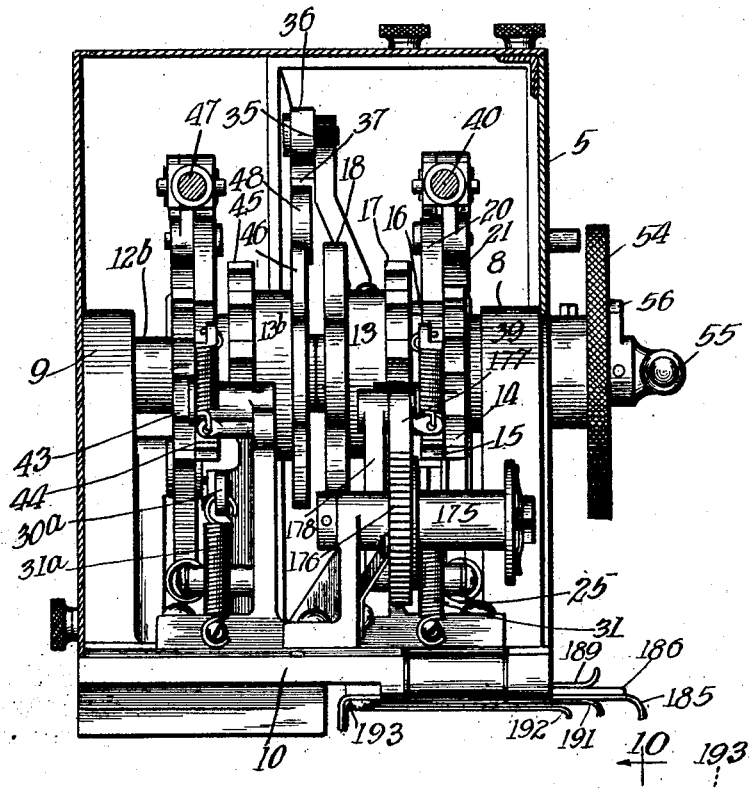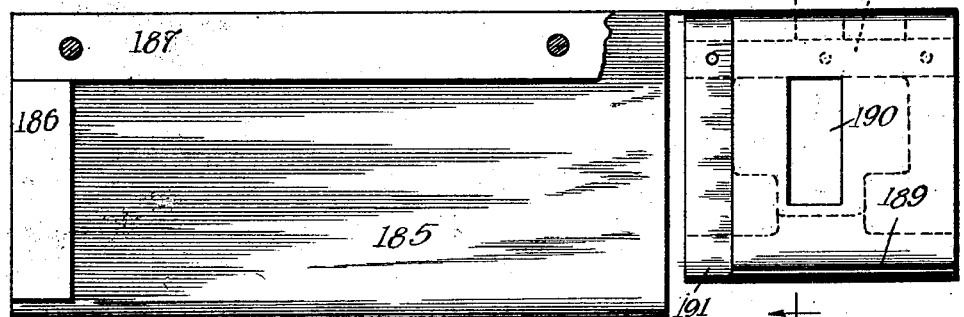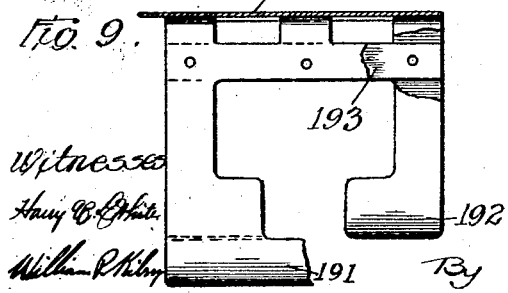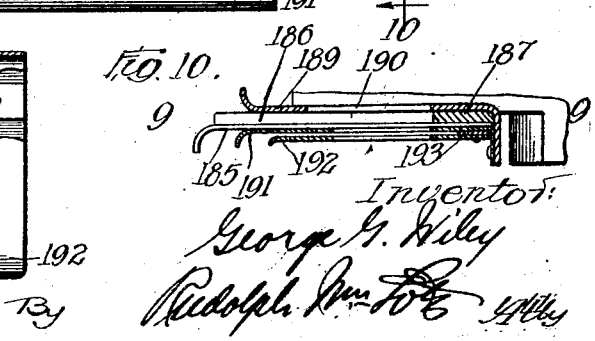

April 20, 1926.
G. G. WILEY
1,581,771
AUTOMATIC RECORDING TRACK SCALE
Filed March 11, 1925 15 Sheets-Sheet 7
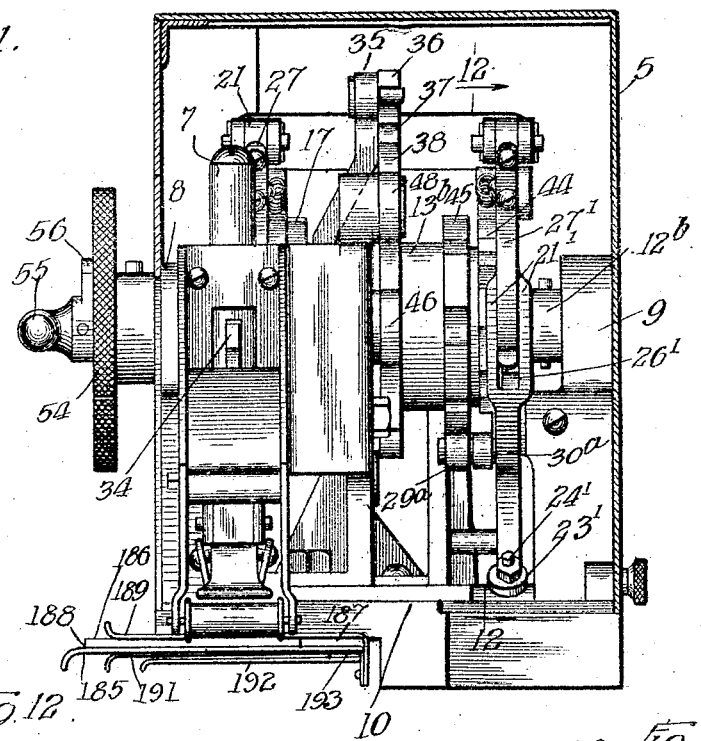
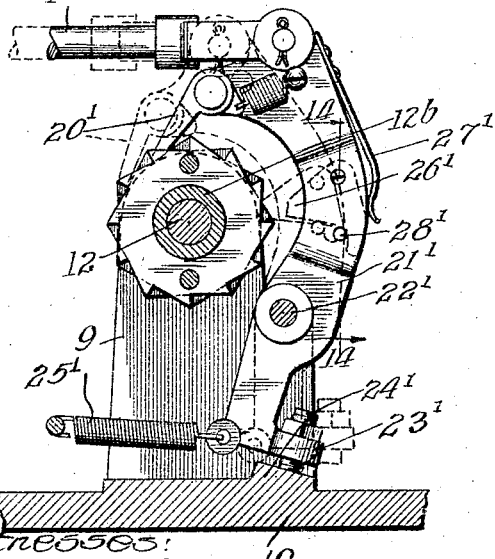

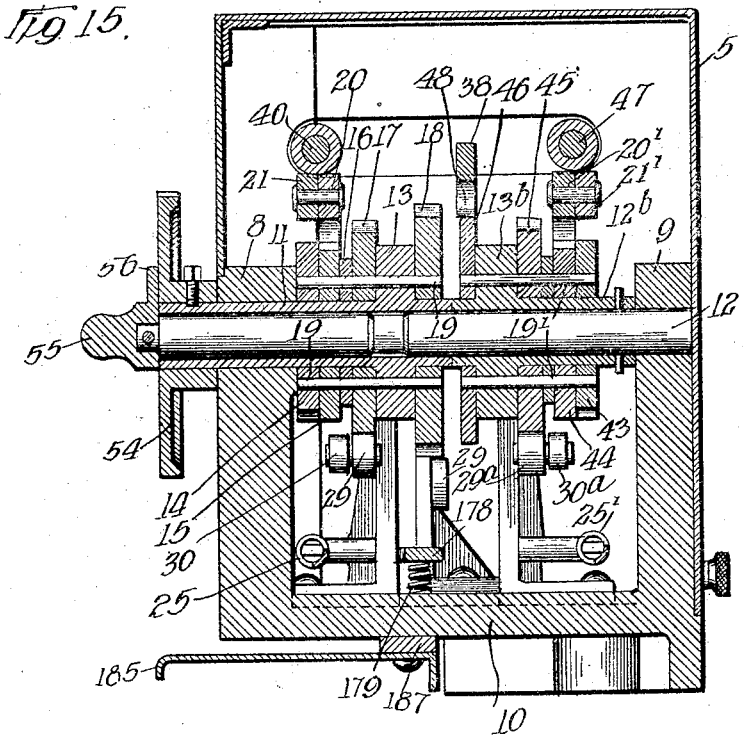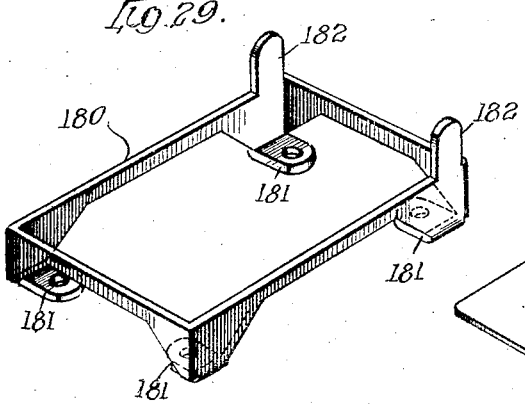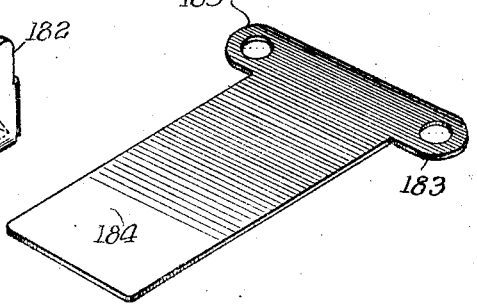

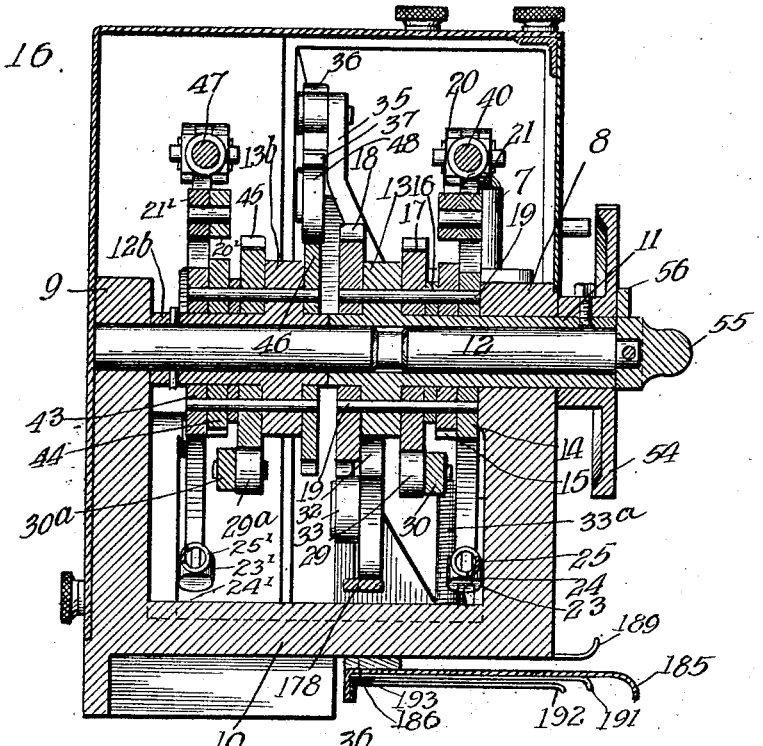
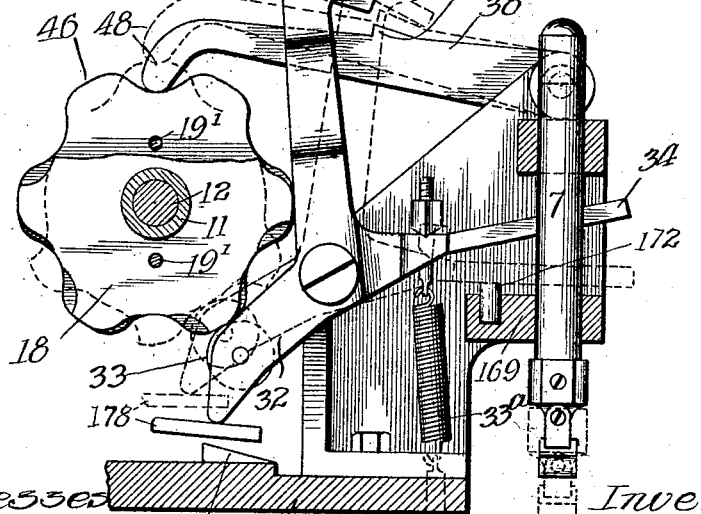

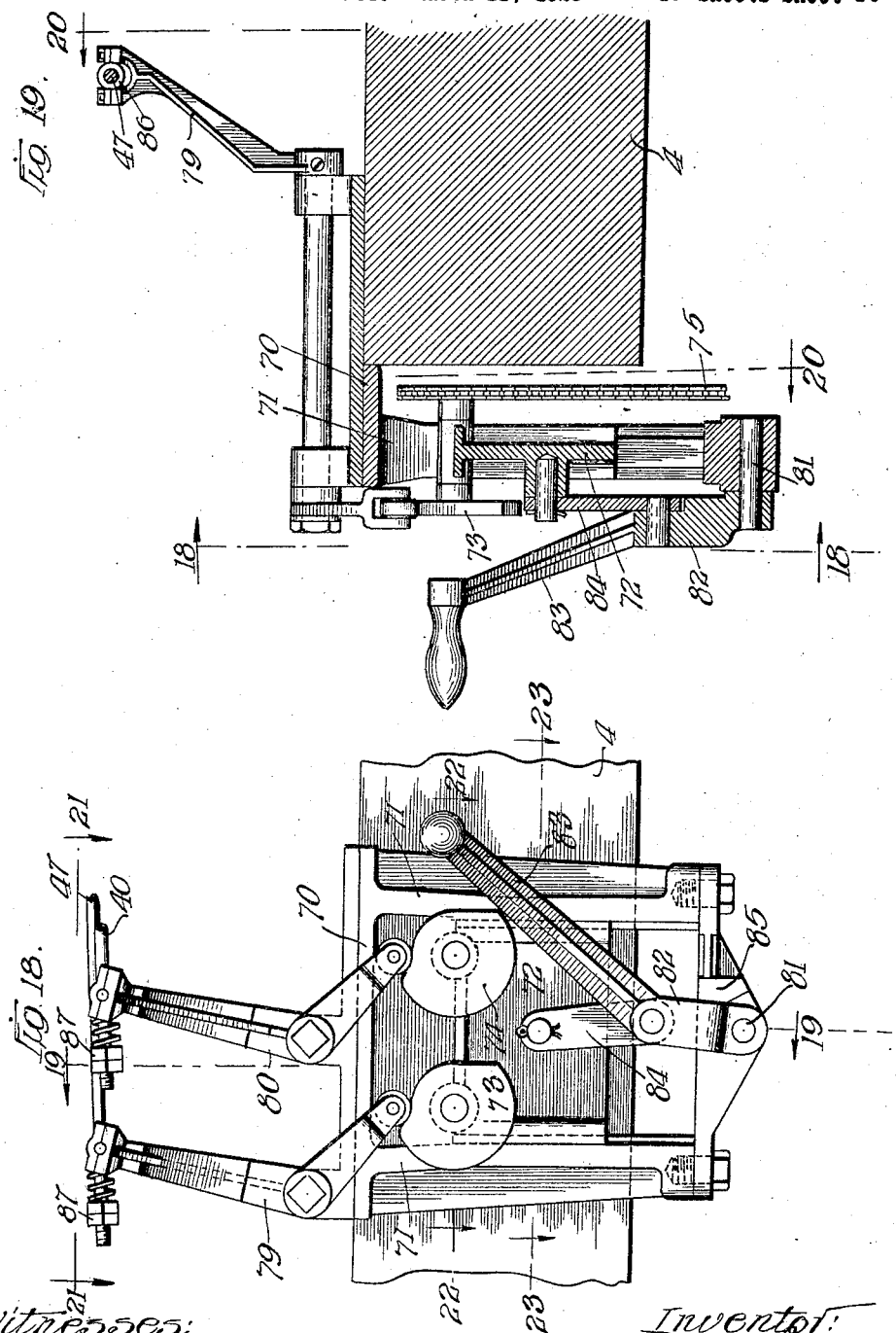

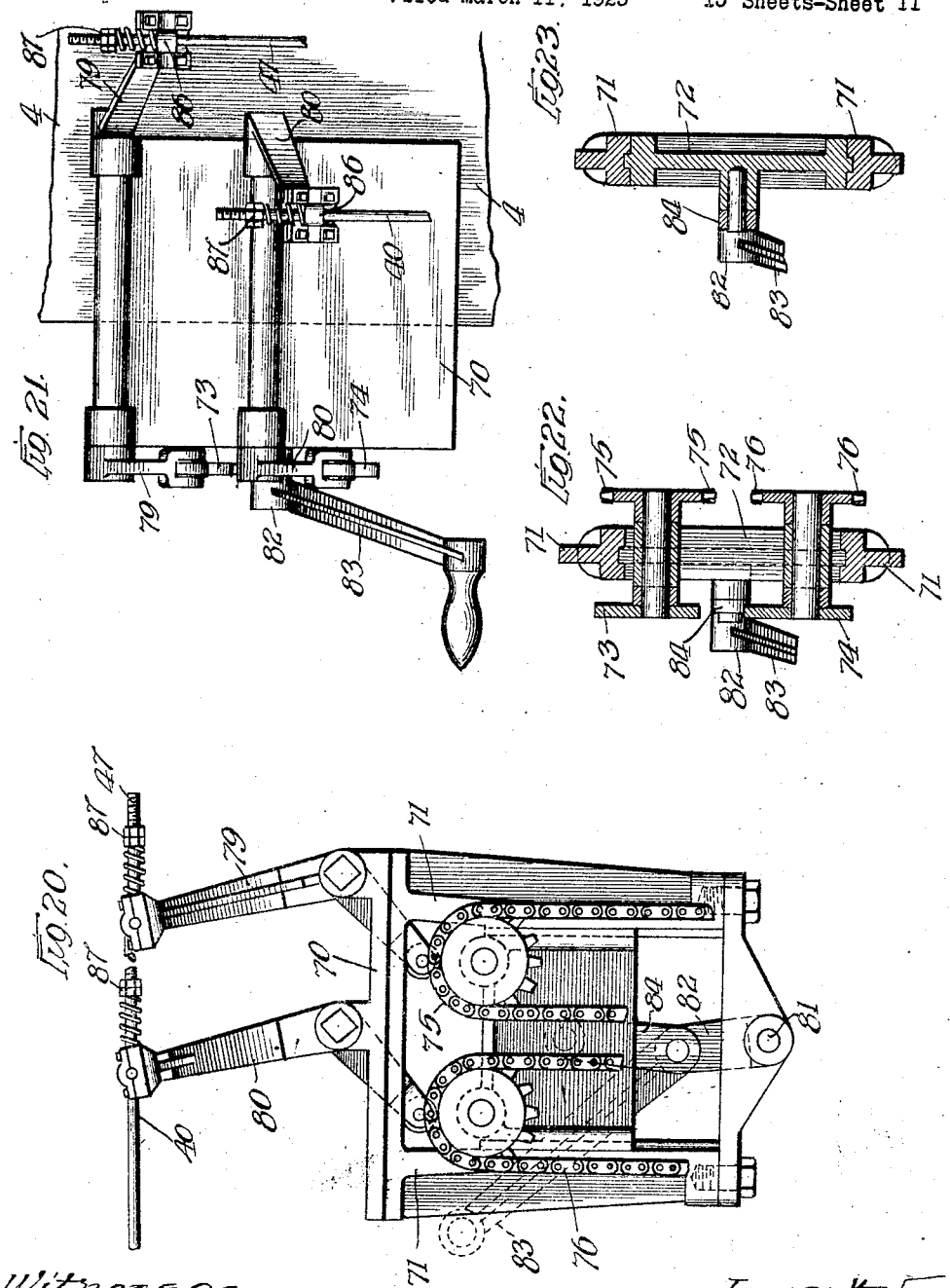

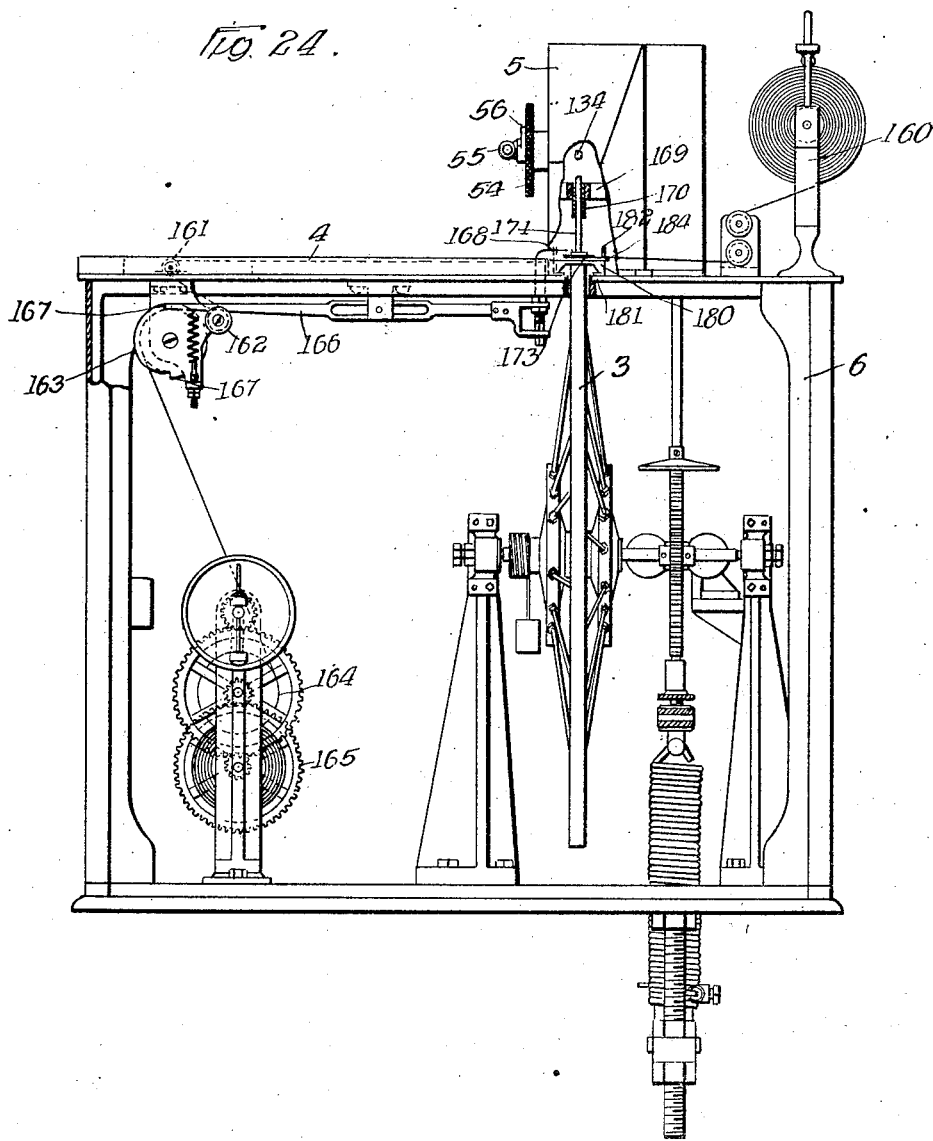

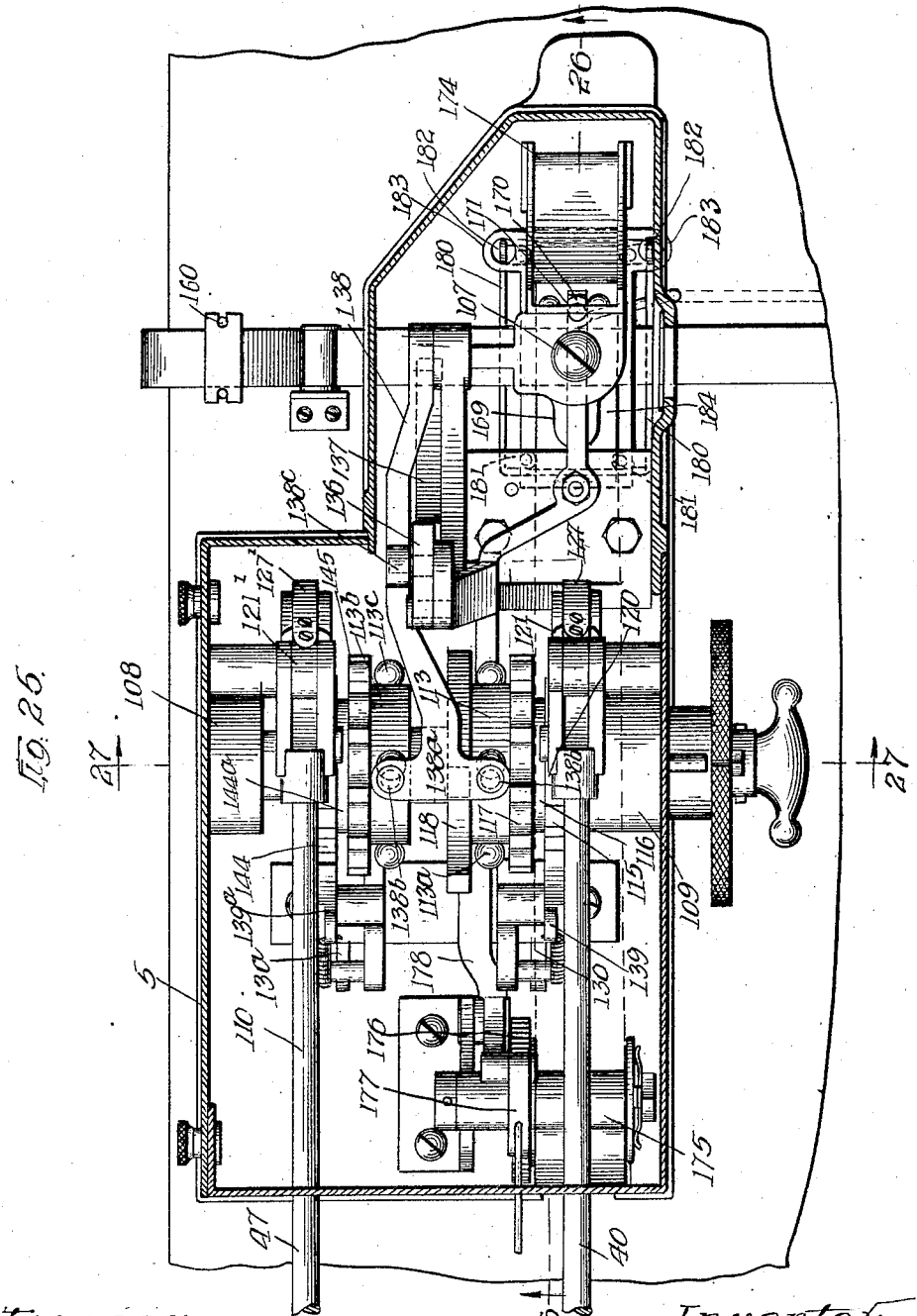

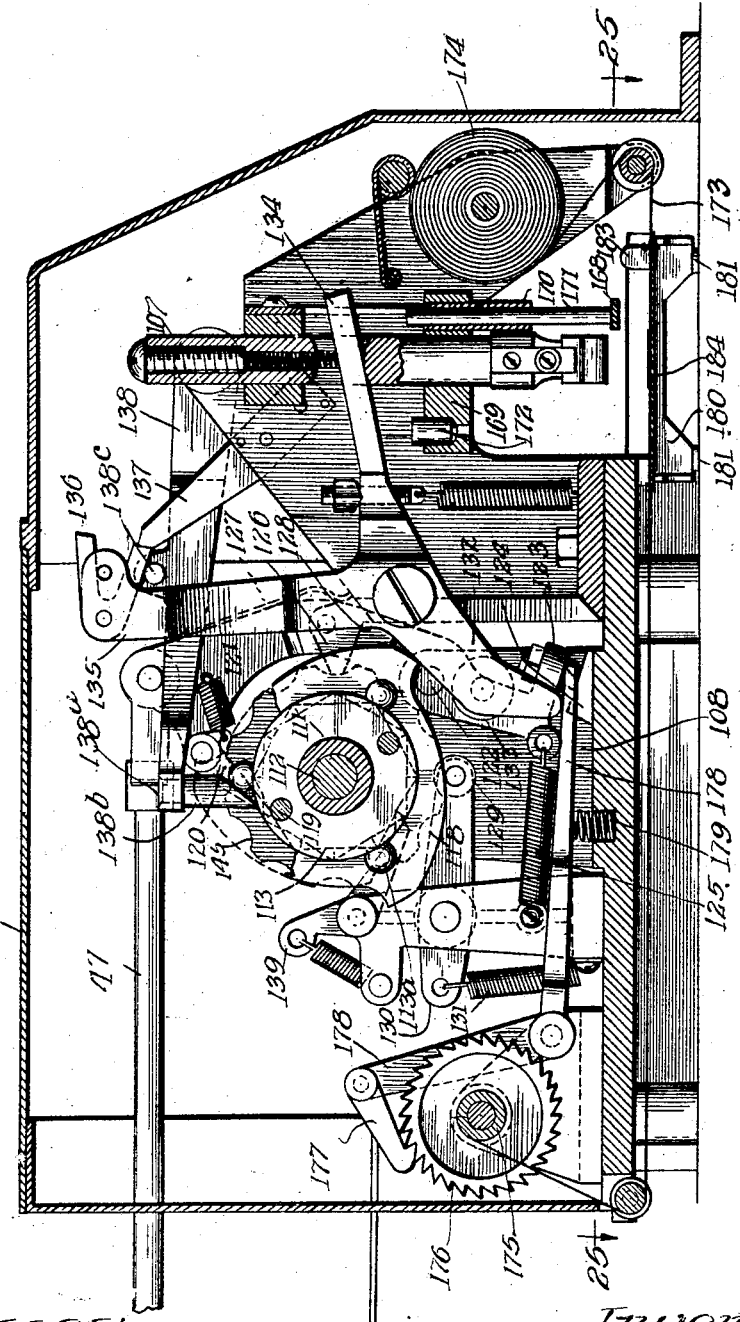

April 20, 1926.

G. G. WILEY

AUTOMATIC RECORDING TRACK SCALE

Filed March 11, 1925      15 Sheets-Sheet 15

Witnesses
Harry C. White
William P. Kilroy

Inventor
George G. Wiley
By Rudolph Wm. Lotz Atty.

Patented Apr. 20, 1926.

1,581,771

UNITED STATES PATENT OFFICE.

GEORGE G. WILEY, OF CHICAGO, ILLINOIS, ASSIGNOR TO STREETER-AMET WEIGHING & RECORDING COMPANY, OF CHICAGO, ILLINOIS, A CORPORATION OF ILLINOIS.

AUTOMATIC RECORDING TRACK SCALE.

Application filed March 11, 1925. Serial No. 14,845.

*To all whom it may concern:*

Be it known that I, GEORGE G. WILEY, a citizen of the United States, residing at Chicago, in the county of Cook and State of Illinois, have invented certain new and useful Improvements in Automatic Recording Track Scales, of which the following is a specification.

This invention relates to improvements in recording mechanisms for weighing scales, and more particularly the so-called automatic track scales for weighing railway freight cars while in motion either in uncoupled or coupled relation.

The main object of the present invention is to provide automatic weight recording mechanisms adaptable to the two types of weighing, viz: uncoupled or coupled, without material change in construction of a substantially standard mechanism, which are very simple, efficient and compact and may be very quickly and easily adapted for manual as distinguished from automatic operation when necessary or desirable.

Generally speaking the recording mechanism of the present invention is adapted to carry out substantially all of the objects of the invention constituting the subject matter of my pending application for Letters Patent of the U. S., Serial No. 712,288, filed May 10, 1924, from which the present invention distinguishes in certain important particulars hereinafter fully described and claimed.

In the accompanying drawings illustrating the preferred embodiments of the invention:

Fig. 1 is a view in elevation of the scale-beam supporting frame of a weighing-scale equipped with recording mechanism constructed in accordance with the invention.

Fig. 2 is a diagrammatic plan view of the scale platform and railway, etc.

Fig. 3 is a fragmentary transverse section on the line 3—3 of Fig. 2.

Fig. 4 is a plan view of recording mechanism, the housing thereof being shown in section.

Figs. 5 and 6 are vertical sections of the same on the lines 5—5 and 6—6, respectively, of Fig. 4.

Fig. 7 is a vertical section on the line 7—7 of Fig. 5.

Fig. 8 is a plan section on the line 8—8 of Fig. 5.

Fig. 9 is a section on the line 9—9 of Fig. 10.

Fig. 10 is a section on the line 10—10 of Fig. 8.

Fig. 11 is a vertical section on line 11—11 of Fig. 5.

Fig. 12 is a section on the line 12—12 of Fig. 11 and Fig. 4.

Fig. 13 is a section on the line 13—13 of Fig. 14.

Fig. 14 is a section on the line 14—14 of Fig. 13 and Fig. 12.

Fig. 15 is a section on the line 15—15 of Fig. 5.

Fig. 16 is a section on the line 16—16 of Fig. 5.

Fig. 17 is a detail view illustrative of the operation of the gravity recording mechanism.

Fig. 18 is a section on the line 18—18 of Fig. 19.

Fig. 19 is a section on the line 19—19 of Fig. 18.

Fig. 20 is a rear elevation seen from line 20—20 of Fig. 19, of mechanism for rendering the recording mechanism non-automatic when desired.

Fig. 21 is a top plan view on line 21—21 of Fig. 18, of the mechanism shown in Fig. 20.

Figs. 22 and 23 are sections on the lines 22—22 and 23—23, respectively, of Fig. 18.

Fig. 24 is an interior view of a housing illustrative of the type wheel and tape-printing mechanism constituting a part of the recording mechanism.

Fig. 25 is a section similar to Fig. 4, showing couple-weighing recording mechanism.

Fig. 26 is a plan section on the line 26—26 of Fig. 25.

Figure 27:
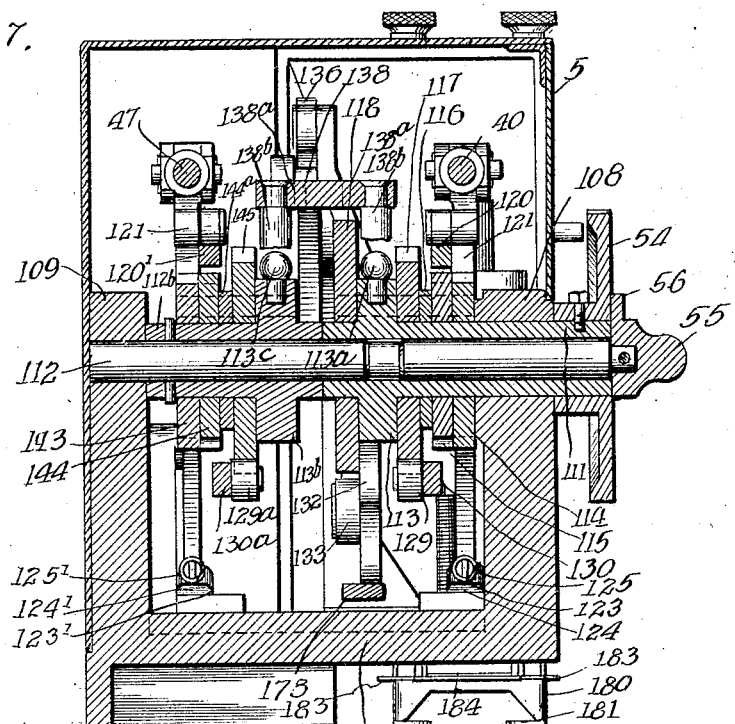

Fig. 27 is a section on the line 27—27 of Fig. 25.

Figure 28:
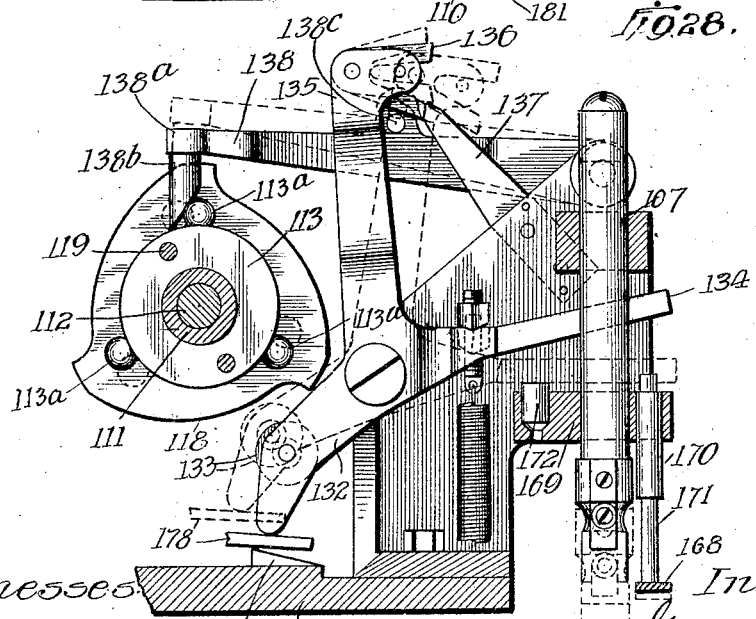

Fig. 28 is a view in elevation illustrative of the operation of the mechanism.

Figs. 29 and 30 are perspective views of parts of the tape record-printing means.

The present invention is, with respect to mode of operation and results, very similar to the subject matter of my pending application for patent, Serial No. 712,288, filed May 10, 1924, being different from the latter, more particularly with respect to structural details and relative arrangements of parts, all as will appear from the following description.

The scale beam 1 is hung and operatively associated with the scale-platform 2 in the same manner as is described in said copending application wherein connections, etc., are illustrated and described in detail, it being understood that any operative association of said beam and platform common in the art and suited to the purpose, may be used. Similarly, the operative association of the beam 1 with the printing wheel 3 (Fig. 24, Sheet 12) is the same as is illustrated and described in said copending application and in my application, Serial No. 692,647, filed February 14, 1924, it being also understood that any suitable and well-known operative association of beam and type-wheel may be employed.

Mounted on the top of the frame member 4 of the scale-beam support, is a casing 5 which contains either of two weight-recording mechanisms, one thereof being adapted for so-called "gravity" weighing of cars in motion, whereby is meant the weighing of individual uncoupled cars in such order of succession that a car must be in such position on the platform 2 as to have been weighed and its weight recorded before any part of the next car imposes its weight on the platform; the other of said mechanisms being for so-called "couple-weighing", whereby is meant the successive weighing of all cars in a train while coupled together.

For gravity weighing the platform 2 is of considerably greater length than for couple-weighing, and the recording mechanism adapted for each type differs to the extent that the conditions incident to the two types vary.

From the manufacturing standpoint it is obviously most advantageous to employ recording mechanisms for both types of weighing which are, in the main, identical in construction and require only slight variation for adapting mechanism for recording the weights of cars by the gravity type platform, etc., to recording the weights by the couple-weighing type of platform, etc., and vice versa. Hence, one of the main objects of the present invention is in harmony with the foregoing.

Saving of space occupied by the recording mechanism and arranging the means for manually setting and operating the same so that error is reduced to a minimum, are also important and another object of the invention is in harmony therewith.

Printing of records is, in some instances, preferred to be on tape and in other instances, on individual cards and it is, therefore, important that either type of record receiving means may be employed without other change in structure than substitution of elements, and it is, consequently, another important object of the invention to provide interchangeable means, with either type of recording mechanism and its housing, whereby the records may be made on tape or cards as desired, by a simple substitution of elements.

The housing 5 is associated with the housing 6 containing the type or printing wheel operatively associated with the scale-beam 1, as hereinbefore stated, the association of the housings 5 and 6 being such that the record receiving means (either tape or cards) contained or inserted into the housing 5, will be disposed in proper relation to the said wheel and to a printing plunger 7 constituting a part of the recording mechanism.

The latter, when adapted for "gravity" weighing, comprises a suitable framework or base upon which are mounted the necessary bearings and supports for the mechanism. As shown in Figs. 4, 7 and 15 most clearly, there are two main bearings 8 and 9 disposed on posts integral with the base 10. In the bearing 8 there is journalled a hollow shaft 11 and in the bearing 9 there is journalled the shaft 12 which passes in part through the hollow shaft 11, said shafts 11 and 12 being rotatable relatively to each other.

On the shaft 11, between its ends, is an annular flange 13. At one side of this are four distinct elements 14, 15, 16 and 17, respectively, and at the other side thereof is a cam-surfaced disk 18, all of said elements 14 to 18, inclusive, being non-rotatably associated with the flange 13 by means of the key-pins 19 and 19' (see Fig. 12).

The elements 14 and 15 are ratchet-wheels having an equal number of teeth, the radial faces of the teeth of the ratchet 14 being opposed to those of the teeth of the ratchet 15. The element 16 is a spacing washer and the element 17 is a disk having a number of peripheral recesses corresponding to the number of teeth of each of the ratchets 14 and 15 and equal to twice the number of cam-projections on the periphery of the element or disk 18. This relation constitutes a two cycle as distinguished from a four cycle mechanism.

Associated with the ratchet 15 (see Fig. 5) is a spring-held dog or pawl 20 which is pivotally mounted on an arm or lever 21 pivotally mounted between its ends on a stud 22 which is carried by the support for the bearing 8. The arm or lever 21 is provided at its lower end with an adjustable stop-screw 23 which is normally held in contact with the stop projection 24 of the base 10 by means of the tension-spring 25 which serves to retain the arm or lever 21 normally in the position shown in Fig. 5. Between the pivot 22 and the dog 20, the arm or lever 21 is provided with a second pivoted dog or pawl 26 mounted in a slot in the same and normally held in a fixed position by the flat-spring 27 and the stop-pin 28. The said arm or lever 21 is offset between its ends so that said pawl 26 is disposed for engagement with the ratchet 14 as said lever 21 attains the limit of its actuating stroke relatively to the ratchet 15, to thereby prevent the latter from being rotated by momentum through an arc in excess of that imparted to it by said pawl 20. Such excess rotation is further prevented, and the ratchets 14 and 15 maintained in position to which they are turned at each actuation of the lever 21, by the engagement of the anti-friction roller 29 in a recess of the disk 17, said roller being mounted in one end of the lever 30 suitably pivotally supported between its ends and held by the spring 31 to maintain said roller 29 in firm engagement at all times with said disk 17.

Each of the said elements 14 to 17, inclusive, is equipped with twelve peripheral formations, in the instance illustrated, for the reason that cars to be weighed are usually provided with a two-wheel truck at each end, or a single four-wheel truck. In the last-mentioned case, the said elements are actuated twice as each car passes from the scale-platform and over a track-lever 32 associated with said platform and with the arm or lever 21 as hereinafter fully described. If the car has two four-wheel trucks and the track-lever 32 is of a length exceeding that of the wheel bases of said trucks, the frequency of operation per passing car will be the same. The cam-disk 18 is, however, equipped with only six cam projections, so that one thereof comes to a predetermined position, actuating the printing plunger 7, after the first of each two actuations of ratchets and then retracts same upon the second actuation. This so-called "two-cycle" type of mechanism is used mainly at mines or where small cars are employed.

Associated with the cam-disk 18 and said printing plunger 7, is a three-armed lever, one arm 32 of which carries a roller 33 disposed for constant engagement with the periphery of the disk 18, the lever being so held by the spring 33ª. The arm 34 of said lever passes through a slot in the plunger 7 for actuating the latter, and the arm 35 carries a pivoted dog 36 for engaging a projection 37 on an arm or lever 38 to prevent a printing stroke of the plunger 7 under certain conditions hereinafter fully explained.

The cam projections of the disk 18 are of such a nature as to cause the roller 33 to be moved relatively gradually to its maximum distance radially from the axis of said disk 18 and then suddenly to its minimum radial position, being thus substantially tripped at the moment the ratchets 14 and 15 attain the end of the first of two succeeding actuations by the dog 20. The printing plunger 7 is thus actuated to effect printing of a weight-record and, at the next or second of two succeeding actuations of said ratchets is returned to the position shown in Fig. 5.

In order to prevent reverse movement of the ratchets 14 and 15, a spring-held dog 39 is associated with the ratchet 15 in a very commonly known manner.

The arm or lever 21 is connected by means of the rod 40 and a train of connecting means, with the track-lever 41 (Fig. 2) at the discharge end of the scale-platform 2, said lever being similar to the lever 32 of Fig. 3 disposed at the receiving end of the said platform, said track-levers being disposed for depression by the flanges of the car wheels.

The mechanism associated with the shaft 12 by means of the sleeve 12ᵇ having the annular flange 13ᵇ, is almost identical with that associated with the shaft 11. It includes the two oppositely toothed ratchets 43 and 44, the disk 45 having the peripheral recesses, and the cam-disk 46. The several elements 43 to 46 correspond in all respects with the elements 14, 15, 17 and 18 respectively. The ratchets 43 and 44 are actuated similarly to the ratchets 14 and 15, the function and means associated with the disk 45 for effecting functioning of the latter being substantially the same as those of the disk 17. The only difference between the mechanisms lies in the function of the cam-disk 46, which instead of serving to actuate a printing plunger, is associated with the lever 38 for controlling the actuation of said printing plunger 7. The peripheral formation of the disk 46 differs slightly from that of the disk 18, as shown in Fig. 17.

The ratchets 43 and 44 are associated with the track-lever 32 at the receiving end of the platform 2 by means of the rod 47 and a train of connecting means similarly to those connecting the rod 40 with the track-lever 41. Associated with the disk 45 is a roller 29ª at one end of the spring-held lever 30ª corresponding to roller 29 and lever 30.

It will be obvious that a car can be correctly weighed and its weight recorded only if the scale-platform 2 is empty of another car up to the instant that a front wheel of one car strikes the track-lever 41 and thus actuates the printing plunger 7. If, before this happens, a second car enters upon the platform 2, no matter how slightly, the added load on the platform will be instantly transmitted to the type-wheel to rotate the same to a position approximately corresponding to the added weight and if, under such condition, the printing plunger 7 were to be actuated as the front wheel of the car about to leave the platform 2 passes over the track-lever 32, the recorded weight would be erroneous.

As the front wheel of a car entering upon the platform 2 strikes the track-lever 41, it effects a partial rotation of the shaft 12 and the cam-disk 46. The curved end 48 of the lever 38, which normally engages the said cam-disk 46 between two of the cam projections, is thus thrown up so that its curved end portion 48 is supported upon a cam projection and thereby the projection 37 of said lever 38 is thrown into the path of the dog 36 of the three-armed lever which actuates the printing plunger 7. Consequently, if, following this movement of the arm or lever 38, the cam-disk 18 is turned to position to trip the three-armed lever, the latter will be prevented from making its movement. The arm or lever 38 is gravity actuated and the pressure exerted thereon by the dog 36 under the influence of the spring 33ª is sufficient to support the same in its elevated position. Consequently, as a rear wheel of an entering car passes over the track-lever 32, and thus returns the cam-disk 46 to its normal position with a recess opposed to the curved end 48 of the lever 38, the latter is prevented from dropping back to the normal position and thus tripping the three-armed lever and the printing plunger 7 before the second wheel of the leaving car has again depressed the track-lever 41 and thus actuated the shaft 11 and the cam-disk 18 to position the latter, so that the roller 33 bears upon the ridge of one of the cam projections of the disk 18. This causes a sufficient reverse movement of the three-armed lever to throw the dog 36 out of engaging relation to the projection 37 and thus causes the arm 38 to drop back to the position shown in Figs. 5 and 6. In Fig. 6 the lever 21' and parts associated therewith, corresponding to the lever 21, are shown in dotted lines, said parts including the dog 20', corresponding to the dog 20, dog 26' corresponding with the dog 26, spring 25' corresponding with spring 25. A dog 39ª, corresponding with dog 39, is also employed. All other parts of the mechanism associated with the track-lever 41 are indicated by the same reference numerals as the corresponding parts of the mechanism associated with track-lever 32 with the character (') added.

From the foregoing it will be obvious that the car which was leaving the platform as the next succeeding car was entering upon the same, must be reweighed, but that the two mechanisms associated with the respective track-levers 32 and 41 are now in position to record the weight of the last-mentioned car as it is about to leave the platform, unless it should again happen that another car follows it too closely.

The foregoing operation of the mechanism associated with the track-lever 41 will be best followed by reference to Fig. 17, wherein the several portions of the arm or lever 38 and the three-armed lever, as well as the cam-disks 18 and 46, are shown in full and dotted lines respectively.

The disk 46, being associated with the track-lever 32 at the receiving end of the platform 2, as above described, will be actuated by the first wheel of a car entering upon the said platform and turned to the position shown in dotted lines in Fig. 17, thereby elevating the lever 38 to the dotted line position and disposing the projection 37 in the path of the dog 36. If now the front wheel of the car about to leave the platform strikes the track-lever 41, thereby turning the disk 18 to the position to permit the roller 33 and three-armed lever to move to the position shown in dotted lines in Fig. 17, this will be prevented by engagement of dog 36 with projection 37 as above explained. It is quite obvious that the second wheel of the car just entering upon the platform 2 will strike the track-lever 32 before the second wheel of the car leaving said platform again strikes the track-lever 41. Thus the disk 46 will be returned to full line position and the three-armed lever will retain the full line position (substantially), because of the pressure of the dog 36 against the projection 37. But as soon as the second wheel of the car just leaving the platform 2 strikes the track-lever 41, the three-armed lever will receive just sufficient reverse movement to exactly the full line position of Fig. 17, to release the dog 36 from engagement with the projection 37 and thereupon both the mechanisms are again disposed in normal operative position.

A very advantageous result of the relative arrangements of the mechanisms on concentric shafts as shown and described above, lies in the fact that it enables an attendant to see instantly whether the respective cam-disks 17 and 46 are in proper relative position to render the recording mechanism operative whether the latter is being automatically or manually operated. To this end the hollow shaft 11 is provided at its projecting end with a knurled disk 54 which is provided with radial indicating marks on its outer face corresponding in number and location with the extremes of the cam projections of the disk 18. On the wall of the housing behind said disk 54 is a mark which, in turn, by register with any one of said disk-markings, will indicate whether said cam 38 is in the position in which the three-armed lever is in the full line position of Fig. 17. On the end of the shaft 12 there is a knob 55 equipped with an indicating projection 56 which is positioned to correspond to that of the bottom of a recess of the disk 46. Consequently, if said projection 56 registers with a radial mark of the disk 54, the attendant is instantly advised that the two mechanisms are properly positioned relatively to each other, and if a radial mark of the disk 54 also registers with the mark on the housing, then the attendant knows that operation may go forward as above described. If, however, either indicating means is out of register as above described, then a manual operation of either the disk 54 or the knob or handle 55, or both, must be resorted to for properly positioning both said mechanisms.

If, by reason of disorder of a track-lever or of a connecting element between the same and the operating lever of either of said mechanisms, the automatic operation must be interrupted, the said mechanisms may be operated by the attendant by means of the said disk 54 and knob or handle 55, by first dissociating one or both mechanisms from the track-levers 32 and 41. This is instantly accomplished at will by the means shown particularly in Figs. 18 to 23, and will be hereinafter fully described, following description of the mechanism shown in Figs. 25 to 28, inclusive, relating to the weighing of coupled cars successively, all other mechanisms included in the scale being the same for either gravity or couple-weighing.

In couple-weighing, the travel of cars over the platform 2 is very much slower than in gravity weighing and the total length of the platform 2 is substantially that of one of the cars. The track-lever 32 at the receiving end of the platform is disposed so that it will be actuated by the front wheel of an approaching car just before the latter passes upon said platform, and the track-lever 41 is disposed upon the platform at its delivery end for actuation just as the front wheels of a car are about to pass from the platform. Both levers 32 and 41 are arranged to effect tripping of the printing plunger of the recording mechanism in the manner hereinafter described, so that the one of said track-levers that is first to be actuated will effect recording of the weight on the platform, the actuation of the other of said levers, either following or simultaneously with that of the other thereof, having no effect on the recording mechanism other than to effect a resetting of the latter.

The advantage resulting from the relative arrangement of the two mechanisms so that the rotatable elements thereof are disposed concentrically, becomes most apparent when the same are modified to adapt substantially the same mechanisms to either the gravity or couple-weighing.

Referring now to Figs. 25 to 28, inclusive, Sheets 13, 14 and 15, it will be noted that the same base, bearings, shafts, sleeves, etc., as are shown in connection with the gravity-weighing mechanism, are shown, the several elements being indicated by similar reference characters to which one hundred is added. Thus, the bearings 8 and 9 and the base 10 of the drawings illustrative of the gravity type, are indicated on Figs. 25 to 28 as 108, 109 and 110, respectively. The hollow shaft 111 is journalled in the bearing 108 and the shaft 112 is journalled at one end in the bearing 109 and at its other end in said hollow shaft 111, the sleeve $112^b$ being keyed to the shaft 112. The hollow shaft 111 is provided between its ends with the integral annular flange 113 and the sleeve $112^b$ is similarly provided with the integral annular flange $113^b$. The said flanges 113 and $113^b$ are equipped each with three equally spaced substantially spherical projections $113^a$ and $113^c$, respectively, for "four-cycle" operation whose function will be hereinafter particularly described.

The sleeve 111 is equipped with the opposed ratchet wheels 114 and 115, the spacing washer 116, the peripherally notched disk 117 and the cam-disk 118.

The sleeve $112^b$ is equipped with the opposed ratchets 143 and 144, the spacing washer $144^a$ and the peripherally notched disk 145, but is devoid of a cam-disk corresponding to disk 46 of the gravity-weighing mechanism.

The structure of Figs. 25 to 28 also differs from that of the gravity-weighing, in that it is of the four-cycle type, adapted for recording the weights of cars having two trucks of four wheels each, and for this reason the cam-disk 118 has only three high points or cam formations and the flanges 113 and $113^b$ are provided with only three projections $113^a$ and $113^c$, respectively.

The actuating mechanism includes the pawl 120 on the rocking lever 121 pivoted at 122 to a frame element and provided with the projection 123 and set-screw 124. The said rocking lever 121 is held by the spring 125 so that the set-screw 124 contacts with the stop formation on the base 110. It is also equipped with the dog 126, spring 127 and stop-pin 128 for preventing excess rotation of the ratchets 114 and 115.

The rocking lever 130, equipped at one end with the roller 129 for engaging in the recesses in the disk 117 and engaged at its other end with the spring 131, is also employed, as are the spring-held dogs 139 and $139^a$ for preventing reverse rotation of the ratchets 114 and 115.

The three-armed lever having the several arms 132, 134 and 135 and which is pivoted to the frame at 133, is identical in construction and function with the three-armed lever of the gravity-weighing type of recording mechanism.

The only substantial changes in the mechanisms as applied to couple-weighing as distinguished from gravity-weighing, are found in the omission of the cam-disk 46, the mounting of the projections 113ª and 113ᶜ on the flanges 113 and 113ᵇ, respectively, and in the following details of construction.

In place of the lever 38 equipped with the projection 37, a lever 138 is provided which is devoid of a stop formation corresponding to the projection 37 and in place of the latter, a stop-element 137 rigid with the machine frame is employed, this being normally in the path of the dog 136 to prevent tripping of the three-armed lever. The said lever 138 is provided with a cross-head 138ª at its free end and said cross-head is equipped with two bevel-ended projections 138ᵇ normally disposed in the paths of the projections 113ª and 113ᶜ. Said lever 138 is also equipped with a projection 138ᶜ between its ends in the path of which the dog 136 is disposed.

The rocking lever 121 and the similar rocking lever 121' associated with the ratchets 143 and 144, are, respectively, associated with the track-levers 41 and 32, by means of the rods 47 and 40, respectively, it being immaterial, in this instance, which of them is associated with the track-lever 41.

The position of the projections 113ª with respect to the high-points of the cam-disk 118 is in radial alignment, substantially, and normally the position of the projections 113ᶜ corresponds with that of the projection 113ª.

If it is borne in mind that the mechanism associated with the track-lever 32 at the delivery end of the platform operates the cam-disk for resetting the printing plunger after each actuation of the latter and that the mechanism associated with track-lever 41 at the receiving end of the platform effects either locking out (as in gravity weighing) or throw-out (as in couple weighing) of the first-mentioned mechanism with respect to its operative association with the printing plunger 7 to trip the latter, the operation of both types (gravity and couple weighing) will be more readily understood.

The operation will be best understood by reference to Fig. 28 which illustrates in full lines, the normal position of the cam-disk 118 and the three-armed lever just prior to actuation of the track-lever 41 or 32 associated with the ratchets 114 and 115. For convenience, we will assume that the latter are associated with the track-lever 32 at the delivery end of the platfrom 2 and that a train of cars is approaching the latter. As the first wheel of the first car of the train strikes track-lever 41, the hollow shaft 112ᵇ will be rotated through an arc of thirty degrees, thereby causing one of the projections 113ᶜ to pass the beveled end of a projection 138ᵇ of the lever 138, and thus throwing the latter up to the dotted line position. This causes the projection 138ᶜ to strike the dog 136 and move it out of engaging relation to the stop 137, as indicated in dotted lines. Thereupon, the three-armed lever will be instantly moved to the dotted line position to impart a stroke to the plunger 107. There being no load on the platform 2, the stroke of said plunger 107 will record no weight. As the remaining wheels of the first car pass over the track-lever 32, the cam-disk 118 will be rotated through the balance of an arc of one hundred twenty degrees, its final movement of thirty degrees causing its high point to pass over the roller 133 of the three-armed lever to thereby move the latter from its dotted to its full line position and bringing the dog 136 again into engagement with the stop 137.

Let us assume that the next succeeding car strikes the track-lever 32 before the first car (now entirely on platform 2) strikes the track-lever 41. This will result in a repetition of the foregoing operation to thereby effect recording of the weight of the first car. As the remaining wheels of the second car pass over the track-lever 42, the resetting of the three-armed lever and of the plunger 107 is effected.

If all cars in the train were of exactly the same length, the track-lever 41 of the entering end of the platform 2 would not be required for couple weighing and the part of the mechanism which comprises the sleeve 112ᵇ and the elements mounted thereon, could be omitted. But varying lengths of cars in a train will sometimes cause the car approaching the platform to reach the track-lever 41 before the next preceding car has actuated the track-lever 32. Consequently, the car about to enter upon the platform 2 will strike the track-lever 41 just before the next preceding car strikes the track-lever 32. This being so, the track-lever 41, via its connections with the sleeve 112ᵇ, will cause one of the projections 113ᶜ (at this time in exactly the same position as the projections 113ª) to strike the other of the two bevel-ended projections 138ᵇ of the lever 138 to thereby throw the latter to the dotted line position and effect tripping of the printing plunger 107. Hence, the car about to enter upon the platform effects the recording of the weight of the car on the platform. If both track-levers 41 and 32 are simultaneously actuated, the result will be the same.

The actuation of one of the track-levers following the other thereof will not in any way affect the operation of the recording mechanism, because after being tripped, the three-armed lever retains substantially the dotted line position shown, except that it is gradually returned to full line position and, as neither track-lever can be actuated more or less than four times in succession by each car, the set of projections 113ª or 113ᶜ associated with that track-lever, cannot be returned to any position other than the full line one of Fig. 28 as each car passes over the track-lever associated therewith, and this makes impossible the tripping of the three-armed lever more than once for each car passing over the platform 2. In couple weighing, the disk 54 must be rotated by hand the instant the first car of the train has passed the track-lever 41 in order to reset the printing plunger to record the weight of the car as the latter strikes track-lever 32.

Having now described the mechanisms by which the recording of car-weights is effected, or the recording prevented, and having referred, in connection with said description, to manual operation of the recording mechanism, I will next describe the means for dissociating the aforesaid mechanisms, for automatic operation, from the track-levers 32 and 41. This may be desirable in instances where the locomotive of the train passes over the platform 2, or empty cars are included in the train or series of cars to be successively weighed, or a car not weighed is returned over the platform (reversely) for reweighing, and in case of any disorder of the automatic mechanism.

The beam 4 of the frame (Fig. 1) carries a guide-frame 70 having parallel vertical guide rails 71 between which a block 72 is vertically reciprocable. This block carries the bearings for the shafts of the two cams 73 and 74, respectively. Each of said shafts is provided with a sprocket-wheel over which is trained a sprocket-chain 75 and 76, respectively. One end of each of these chains is connected with a tension spring 77 and 78, respectively, anchored at its other end to a rigid element. The other ends of said sprocket-chains are suitably connected with the respective track-levers 32 and 41, so that as the track-lever 32 is actuated, one of said cams will be given a rotary movement through a short arc, and when the track-lever 41 is actuated, the other of said cams will be similarly actuated.

Bell-crank levers 79 and 80, respectively, are associated with said respective cams 73 and 74. Said bell-crank levers are suitably pivotally supported at their elbows and each thereof is equipped at one end with an anti-friction roller normally bearing upon one of said cams, the normal position of the latter being such that said rollers bear upon the peripheral portions of least radius and contiguous to the peripheral portions of greatest radius. Consequently, the short arcuate movement of one of said cams will cause the bell-crank lever associated therewith to be rocked on its pivot to a predetermined extent. The said bell-crank levers are associated with the respective rods 40 and 47 at their other ends, by means of a sliding connection (hereinafter described in detail), including a cushioning spring, so that at each rocking movement of said levers, the levers 21 and 21', or 121 and 121', respectively, associated with said rods, will be actuated.

Pivotally mounted in the lower part of the frame 70, is a manually operable rock-shaft 81 provided at one end with a bell-crank lever 82, the free end portion of which constitutes an operating lever 83. The elbow portion of the lever 82 is pivotally connected with a link 84 which is also pivotally associated with the block 72, the said link and lever constituting a toggle-lever. The lever 82 is associated with a stop 85 for retaining it and the link 84 in a position (just beyond the dead-center position) wherein it and the said link support the block 72 at the upper limit of its movement, so that the cams 73 and 74 are operatively associated with the bell-crank levers 79 and 80. By throwing the operating end portion of the lever over beyond the said dead-center position, the cams 73 and 74 will be instantly lowered out of operative relation to said bell-crank levers and thus the recording mechanism dissociated from the track-levers 32 and 41, respectively.

The upper ends of the bell-crank levers 79 and 80 are bifurcated and in each thereof there is pivotally mounted a sleeve 86 equipped with diametrically opposed trunnions, the rods 40 and 47 passing through said sleeves and being equipped at their ends with nuts and washers 87. Compression springs 88 are disposed between the washers and one end of each of the sleeves 86 for cushioning the sudden impetus given to each rod as the track-lever associated therewith is suddenly depressed by a car-wheel.

It will be noted, by reference to Fig. 19, that each of the bell-crank levers 79 and 80 is composed of a relatively long shaft, to the opposite ends of which the respective arms or cranks are secured.

In the manual operation of the recording mechanism, either for gravity or couple weighing, the operator watches the cars passing over the platform successively and operates only the disk 54, since there can be no weight recorded unless the same is operated. Hence, if a second car enters upon the platform 2 before the first car has been thereon for a sufficient period to have brought the type-wheel to proper position, the operator need only ignore the first car by failing to turn the disk 54. In couple-weighing the operator turns only the disk just before each car enters upon the platform and before the preceding car attains the extreme end of the latter.

Referring now to Fig. 24, it will be noted that upon the casing 6 for the type-wheel 3, there is mounted a suitable support 160 for a roll of tape. This tape is passed through the housing 5 between the bottom of the plunger 7 and the opposed portion of the periphery of the type-wheel 3. It then passes over an idle roll 161 and over rolls 162 and 163 and is wound upon the reel 164 of the spring-motor take-up mechanism 165. The motor maintains the tape constantly under a given tension from the roll 163, the latter being normally held against rotation by the trip-lever 166, one end of which is disposed in the path of one of the teeth 167 of a side plate of said roll. The trip-lever 166 is pivotally supported between its ends in a bracket at the top of the casing 6, and at its other end is equipped with an adjustable element 168 disposed for depression as the printing plunger 7 is tripped to thereby throw the first-mentioned end of the lever 166 out of engagement with said tooth, to thereby permit tape to be taken up by the roll 165. The said lever 166 instantly returns to the position shown in Fig. 24 following actuation, and is thus disposed in the path of the other of the teeth 167 to prevent further rotation of the roll 163. Thus a predetermined length of said tape is taken up by the roll 164 following each tripping of the plunger 7.

By referring to Fig. 26, it will be noted that the guide element 169 for the printing plunger is equipped with a tubular guide 170 for a plunger rod 171 which rests by gravity on the element 168 of the trip-lever 166, and has its upper end disposed in the path of the arm of the three-armed lever which actuates said printing plunger. In its normal position, the plunger rod 171 has its upper end disposed so that the said arm of the three-armed lever will strike it and give it a downward impetus just as the said arm strikes the rubber cushion 172. The momentum of this blow causes a sufficient movement of the lever 166 to throw its far end out of the path of the tooth 167 with which it is engaged, and also permits return of said lever to its normal position before the printing plunger and three-armed lever are reset, the arrangement or tolerance between the resetting cam for the three-armed lever and the roller which contacts with said cam, being such as to allow the cushion 172 to absorb the shock of the tripping of said lever and to return the latter slightly back toward its reset-position against the action of the spring engaged with said three-armed lever. This recoil from the maximum limit of stroke of said three-armed lever is sufficient to permit the plunger rod 171 to return to its normal position and thus permit the lever 166 to do likewise.

A type-writer ribbon 173 is disposed either between the face of the type-wheel 3 and the tape 160, or between the latter and the printing plunger, depending upon whether the type on the printing wheel are negative to produce a positive impression on the opposed or lower face of the tape, or whether said type are positive and thus would produce a negative or reverse imprint on the opposed lower face of the tape, as in the latter event the imprint must be on the upper face of the tape 160.

The ribbon 173 moves transversely of the tape 160 from the feed spool 174 to the take-up spool 175. Associated with the latter is the ratchet-wheel 176 engaged by a pawl 177 pivotally mounted at the extreme end of a bell-crank lever 178. The latter is pivotally supported at its elbow and the other arm thereof held normally at the upper limit of its movement by the spring 179 and disposed in the path of the lower end of the arm 132 of the three-armed lever, so that as the latter is tripped, the pawl 177 will be moved to engage another tooth of the ratchet 176 and when the three-armed lever is reset, will effect a partial rotation of said ratchet and said take-up spool 175. It will be noted that the ribbon-feed means above described are shown in connection with both the gravity-weighing and the couple-weighing mechanisms.

As previously stated, the tape 160 may be supplanted by cards successively inserted between the printing plunger 7 and the type-wheel 3, and this substitution involves a change of certain plates shown in detail in Figs. 7 to 10 inclusive, and Figs. 29 and 30, and in other figures.

Where the tape 160 is used, there is provided a metal frame 180 (Fig. 29) of rectangular form, equipped with perforated corner flanges 181 for securing the same to the top of the casing 6. This frame is also equipped with corner posts 182 for engaging in the perforations of the ears 183 of a relatively thin tough card 184 (Fig. 10) disposed between the face of the type-wheel 3 and the tape 160 and ribbon, the latter being disposed below the former, as shown in Fig. 26.

Where cards are used, the latter are relatively long, because containing or adapted to contain other records than car weights. Consequently, I provide for the reception and proper positioning of said cards, a relatively large plate 185 secured to and spaced from the base 10, the spacing members 186 and 187 constituting the gauges for proper positioning of the cards. Figs. 7 and 10 show a card 188 positioned on said plate and projecting at one end portion between a plate 189 provided with a rectangular opening 190 for receiving the lower end of the printing plunger, and a plate 191 disposed below the same. The plates 189 and 191 have oppositely disposed flared flanges on their outer edges. Below the plate 191 is a plate 192, both said plates having openings and being spaced from each other by means of spacing plate 193 sufficiently to permit passage of the type-writer ribbon between the same, the openings therein being of sufficient area to permit a partial projection of the face of the type-wheel into the same. All of these plates are suitably secured to the base 10 of the recording mechanism, it being obvious, of course, that when said plates are employed, the frame 180 is omitted, as is also all tape-feeding mechanism.

From the foregoing description it will be quite obvious that while the track-lever 32 and the mechanism associated therewith as adapted for gravity-weighing, constitutes a lockout means for preventing the recording of a car weight by the track-lever 41 and its associated mechanism, the mechanisms may be reversely associated with said respective track-levers so that the entering car serves to effect recording of the weight of the car on the platform just as is possible in the couple-weighing embodiment of Figs. 25 to 28 inclusive. In that event, the leaving car would act to effect actuation of the lockout mechanism, this change of relation being so obvious that special illustration thereof is quite superfluous.

It is also quite obvious that in the couple-weighing type of mechanism, the mechanism first actuated by a car striking the track-lever associated therewith, effects prevention or locking out of the other mechanism in so far as its capacity to actuate the printing plunger is concerned, as does the lockout mechanism of the gravity-weighing type of mechanism. Hence, the two mechanisms are clearly parallel to this extent and differ from each other only in details of construction as above set forth. In each type, the mechanism first actuated renders the other thereof temporarily inoperative in so far as actuation on control of the weight printing means is concerned.

Stated in other words, the first of the two mechanisms to be operated renders idle or ineffective to perform any useful function, the other of said mechanisms.

I claim as my invention:

1. In a weighing scale of the kind specified, weight recording control means including two independently operable mechanisms, each having a main shaft, the said shaft of one thereof being hollow and the shaft of the other thereof projecting at one end through said hollow shaft, weight printing means associated with one of said mechanisms for actuation thereby, means included in the other of said mechanisms for preventing actuation of said printing means, and manually operable devices associated with said shaft for indicating the relative positions of said respective mechanisms and setting or actuating the same.

2. In a weighing scale of the kind specified, a platform, track-levers disposed at opposite ends thereof for actuation by cars passing over said platform, weight printing means, a mechanism for actuating the same operatively associated with one of said track-levers, lockout mechanism for preventing actuation of said printing means by said actuating mechanism operatively associated with the other of said track-levers, each of said mechanisms having a main shaft and the shaft of one thereof being hollow and receiving one end of the shaft of the other, and concentrically disposed manually operable indicating means associated with said respective shafts for indicating the relative positions of said mechanisms and permitting manual setting thereof to any desired predetermined positions with relation to each other.

3. In a recording track-scale including track-levers at respectively opposite ends of the scale platform for actuation by the wheels of passing cars, a weight printing mechanism, two independently operable mechanisms operatively associated with said respective track-levers for actuation thereby and each including a main shaft, one of said main shafts being hollow and the main shaft of the other passing at one end through said hollow shaft, at least one of said mechanisms operatively associated with said printing means for actuating the latter and the other thereof adapted to prevent actuation of said printing means by said other mechanism in event that the track-lever associated with said preventive mechanism is actuated in advance of the actuation of the other track-lever, and concentrically disposed indicating means associated with said respective shafts for indicating the relative positions of said mechanisms and for manually operating either or both thereof.

4. In a track-scale, a weight recording means, an automatic mechanism for actuating the same, a similar mechanism for controlling the actuating mechanism, each of said mechanisms having a main shaft and said shafts concentrically associated, means on said shafts disposed in relation to each other and a rigid element for indicating the relative positions of said mechanism and permitting manual setting of each thereof relatively to the other, a track-lever for each of said mechanisms, and means included in said mechanisms whereby the first of the latter to be operated renders the operation of the other ineffective.

5. In a weighing scale of the kind specified a recording mechanism including a printing plunger and a spring-held trip-lever operatively associated therewith, a rotatable cam operatively associated with the trip-lever for alternately tripping and resetting the same, means associated with said trip-lever for preventing tripping thereof by said cam, two ratchet mechanisms, a track-lever for each thereof, one of said ratchet mechanisms operatively associated with said cam and at least one thereof operatively associated with said means for controlling said trip-lever, said ratchet mechanisms having a common axis of rotation.

6. In a weighing scale, a frame including two alined bearings, a hollow shaft journalled in one thereof, a shaft journalled at one end in the other thereof and passing through said hollow shaft, a cam on each of said shafts, pawl and ratchet mechanisms associated with each of said shafts for rotating the same, a track-lever for each of said mechanisms, weight recording means, a trip-lever associated with one of said cams and with said recording means, and a control device associated with the other of said cams for preventing actuation of said trip-lever by the aforesaid cam upon actuation of said track-levers in given order of succession.

7. In a scale of the kind specified, a weight recording mechanism, a spring-held trip-lever for actuating the same, a tripping and resetting cam operatively associated with said trip-lever, a track-lever operatively associated with said cam, a lever operatively associated with said trip-lever for preventing tripping of the latter, a cam operatively associated with said lever, a track-lever operatively associated with said last-lever named cam, concentric shafts carrying said cams, one of said shafts passing through the other, and an indicating device at one end of each shaft, said indicating devices disposed in close relation for indicating the relative positions of said cams.

8. In a weighing scale of the kind specified, weight recording means including a record receiving tape, a motor for effecting continuous travel of said tape in one direction, mechanism operatively associated with said tape, for preventing travel thereof, a trip-device associated with said mechanism for releasing the tape to permit movement thereof by said motor, a printing plunger, a spring-held trip-lever for actuating the same, a tripping and resetting cam operatively associated with said trip-lever, a track-lever operatively associated with said cam for rotating the same, and means disposed for actuation by said trip-lever and operatively associated with said trip-device for actuating the latter as said trip-lever attains the limit of its spring-responsive movement.

9. In a weighing scale of the kind specified, weight recording means including a record receiving tape, a motor for effecting continuous travel of said tape in one direction, mechanism operatively associated with said tape, for preventing travel thereof, a trip-device associated with said mechanism for releasing the tape to permit movement thereof by said motor, a printing plunger, a spring-held trip-lever for actuating the same, a cushion disposed in the path of said trip-lever as the latter approaches the limit of its spring-responsive movement to effect partial retractive movement of said trip-lever, a tripping and resetting cam operatively associated with said trip-lever, a track-lever operatively associated with said cam for rotating the same, and means disposed for actuation by said trip-lever and operatively associated with said trip-device for actuating the latter as said trip-lever attains the limit of its spring-responsive movement, the partial retractive movement of said trip-lever permitting instant return of said trip-device to initial position.

10. In a weighing scale of the kind specified, weight recording means including a record receiving tape, a motor for effecting continuous travel of said tape in one direction, trip-mechanism associated with said tape for normally preventing travel thereof and for limiting such travel to a predetermined length of tape following each tripping of said mechanism, a printing plunger, a spring-held trip-lever for actuating the same, a tripping and resetting cam operatively associated with said trip-lever, a track-lever operatively associated with said cam for rotating the same, and means disposed for actuation by said trip-lever and operatively associated with said trip mechanism for tripping the latter as said trip-lever completes its spring-responsive movement.

11. In a weighing scale of the kind specified, weight recording means including a record receiving tape, a motor for effecting continuous travel of said tape in one direction, trip-mechanism associated with said tape for normally preventing travel thereof and for limiting such travel to a predetermined length of tape following each tripping of said mechanism, a printing plunger, a spring-held trip-lever for actuating the same, a tripping and resetting cam operatively associated with said trip-lever, a track-lever operatively associated with said cam for rotating the same, and means disposed for actuation by said trip-lever and operatively associated with said trip-mechanism for tripping the latter as said trip lever completes its spring-responsive movement, and a cushion disposed in the path of said trip lever for effecting partial retraction of the same from the limit of its spring-responsive movement, said retraction permitting automatic resetting of said trip-mechanism as said predetermined length of travel of said tape is completed.

12. In a weighing scale, a recording mechanism including a printing plunger, a tape feeding mechanism, a trip-mechanism associated with the latter for permitting intermittent travel of the tape for a predetermined distance, a spring-held trip-lever operatively associated with said trip-mechanism and said plunger for actuating the same in unison, a tripping and resetting cam operatively associated with said trip-lever, a track-lever operatively associated with said cam for rotating the latter, and means independent of said cam for effecting partial resetting of said trip-lever following tripping thereof to thereby permit automatic resetting of said trip-mechanism.

13. In a weighing scale, two track-levers disposed at respectively opposite ends of a scale platform, a recording mechanism including a printing plunger and a spring-held trip-lever for actuating the same, a tripping and resetting cam operatively associated with said trip-lever and with one of said track-levers and normally positioned out of engaging relation to said trip-lever, a lock-out device operatively associated with said trip-lever for maintaining the same normally in reset position, two rotatable elements operatively associated with said lock-out device, one of said elements rigid with said cam and the other thereof operatively associated with the other of said track-levers for actuation, to thereby effect release of said lockout mechanism by the first actuated of said elements resulting from passage of a car-wheel over one of said track-levers.

14. In a weighing scale, a scale platform, a track-lever contiguous to each end thereof, a rocking lever operatively associated with each track-lever, a pawl carried by each rocking-lever, a pair of concentric shafts, a ratchet on each thereof for engagement with said respective pawls, weight recording mechanism, a trip-lever operatively associated therewith for actuating the same, a cam on one of said shafts controlling said trip-lever, means for locking said trip-lever against movement in one direction, means operatively associated with the other shaft for controlling said locking means, means on one end of each shaft including graduations for indicating the position of said shafts relatively to each other, and an indicating mark on a rigid part of the scale associated with said graduations to indicate the position of either or both said shafts with respect to the said rigid part.

GEO. G. WILEY.